United States Patent [19]

Cavitt

[11] 3,856,827

[45] Dec. 24, 1974

[54] SILICON CONTAINING MOLYBDENUM CATALYSTS

[75] Inventor: Stanley Bruce Cavitt, Austin, Tex.

[73] Assignee: Jefferson Chemical Company, Inc., Houston, Tex.

[22] Filed: July 26, 1973

[21] Appl. No.: 382,920

Related U.S. Application Data

[62] Division of Ser. No. 102,137, Dec. 28, 1970, Pat. No. 3,787,329.

[52] U.S. Cl.......................................... 260/348.5 V
[51] Int. Cl............................................. C07d 1/08
[58] Field of Search............................ 260/348.5 V

[56] References Cited
UNITED STATES PATENTS
3,332,965   7/1967   Fukui et al...................... 260/348.5
FOREIGN PATENTS OR APPLICATIONS
1,550,166   11/1968   France Primary Examiner—Norma S. Milestone
Attorney, Agent, or Firm—James L. Bailey; John R. Kirk, Jr.

[57] ABSTRACT

Stable, homogeneous silicon-containing molybdenum catalysts are prepared by incorporating silicon ligands into molybdenum compounds prepared by reacting an ammonia-containing molybdate with a hydroxy compound, for example, an organic primary or secondary alcohol, a glycol or a phenol. The hydrocarbon-soluble, silicon-containing molybdenum solutions are useful as homogeneous oxidation catalysts, particularly for the oxidation of olefins to olefin oxides. Olefin oxides are useful in the manufacture of non-toxic antifreeze, urethanegrade polyols and many other applications. The silicon-containing molybdenum catalysts of the invention may also be used as metal plating solutions, lubricant additives, pigments, ammoxidation catalysts, printing inks, or solution components for organic laser devices. They may also be used as catalysts or co-catalysts for various polymerization processes, such as homopolymerization of isocyanates, isocyanate-polyol reactions, or olefin oxide polymerization reactions.

5 Claims, No Drawings

SILICON CONTAINING MOLYBDENUM CATALYSTS

CROSS REFERENCE TO RELATED APPLICATION

This is a division, of application Ser. No. 102,137 filed Dec. 28, 1970 and now U.S. Pat. No. 3,787,329.

My co-pending application entitled "Hydrocarbon Soluble Molybdenum Catalysts," Ser. No. 102,227, filed of even date with the aforesaid application Ser. No. 102,137 teaches the synthesis of hydrocarbon-soluble molybdenum catalysts prepared by reacting an ammonia-containing molybdate with a hydroxy compound. The compounds of my co-pending application are incorporated with silicon ligands to prepare the catalysts of this invention.

BACKGROUND OF THE INVENTION

1. Field of the Invention

The invention pertains to the chemical field and the synthesis and use of molybdenum catalysts containing silicon.

2. Description of the Prior Art

Giovanni A. Bonetti's and Rudolph Rosenthal's U.S. Pat. No. 3,480,563 (Nov. 25, 1969) discloses organic-soluble molybdenum compounds derived from a direct reaction between molybdic oxide and an alcohol. These compounds are used as catalysts in the epoxidation of olefinic compounds wherein an organic hydroperoxide is used as the oxidizing agent.

SUMMARY OF THE INVENTION

Silicon-molybdenum-hydroxy compound catalysts are prepared with a silicon compound capable of reacting with hydroxy compounds. The silicon catalysts are synthesized by incorporating the silicon ligand with a compound prepared by heating an ammonia-containing molybdate with a hydroxy compound, for example, an organic primary or secondary alcohol, a glycol or a phenol to prepare the silicon-containing molybdenum catalysts. These silicon-containing catalysts of the invention can be preoxidized for better effectiveness as epoxidation catalysts. The invention includes the catalysts prepared by this process and the use of the catalysts for the oxidation of olefins to olefin oxides.

DESCRIPTION OF THE PREFERRED EMBODIMENTS

The invention relates to the synthesis of silicon-containing molybdenum catalysts. To prepare the catalysts, silicon ligands are reacted with hydrocarbon-soluble molybdenum compounds prepared by heating an ammonia-containing molybdate with a hydroxy compound, for example, an organic primary or secondary alcohol or glycol containing 3 to 30 carbon atoms or a phenol to a temperature which dissolves the basic molybdenum compound. Any type of silicon-containing compound capable of reacting with hydroxy compounds reasonable conditions are useful in the synthesis of the catalysts of the invention. Examples of suitable silicon compounds are silicon halides, alkyl, aryl, or alkoxy silicon halides; alkoxy or aryloxy silanes; epoxyalkyl silanes, or epoxy alkoxy silanes. The silicon-containing catalysts can be preoxidized for better effectiveness as epoxidation catalysts.

Conditions necessary to react the silicon compounds may range from about room temperature to several hundred degrees and from 15-minute reaction times to as much as 10 hours. The preferred conditions are temperatures about 100 to 200°C. and reaction times of about 1–4 hours. The following examples illustrate my invention in more detail but are not intended to limit the scope of the invention. Examples 1 and 2 illustrate the synthesis of several catalysts of the invention. Example 3 illustrates the preparation of an olefin oxide using a catalyst of the invention.

EXAMPLE 1

Preparation of a Silicon-Containing Molybdic Acid — Isononyl Alcohol Reaction Product To a 500 ml. distilling flask equipped with a magnetic stirring bar, foam trap, and thermometer where added 133 g. of about 3% Mo (as a molybdic acid-isononyl alcohol reaction product) and 21 g. of beta-(3,4-epoxycyclohexyl)ethyltrimethoxysilane. The Si/Mo g.-atom weight ratio was about 2. The solution was heated under partial aspirator vacuum at reflux temperature (about 150°C.) for 0.5 hour with removal of some alcohol near the end of the refulx period. The deep, red-brown solution was placed on a rotary evaporator and heated on a water bath under full pump vacuum until all excess alcohol had been removed. There was recovered 75 g. of concentrated, viscous solution containing molybdenum and silicon. This solution was diluted with 500 ml. of chlorobenzene and oxidized in a slow stream of oxygen in refluxing chlorobenzene for one hour. The oxidized solution was evaporated to 150–200 ml. on a steam bath under aspirator vacuum, then filtered through Celite filter aid. The filter was washed with a small amount of chlorobenzene — very few residues were observed. The final solution was a clear, dark green color with a blue hue and weighed 194 g. The sample contained 1.69 wt. % Mo and 1.09 wt. % Si by atomic absorption analysis and was stable on storage.

EXAMPLE 2

Preparation of a Silicon-Containing Molybdic Acid — Isononyl Alcohol Reaction Product This experiment was performed as in Example 1, except that 10 g. of silicon tetrachloride was added as the silicon source. The solution was heated gently to about 50°C. as copious quantities of HCl vapors were evolved. The green, homogeneous solution was stirred until it began to cool, then it was placed under aspirator vacuum to remove most of the HCl. The solution was heated to about 140°–160°C. and held for 30 minutes under aspirator vacuum to assure completion of the reaction. The brown solution was transferred to a round-bottom flask, placed on a rotary evaporator, and heated on a water bath under full pump vacuum until all excess alcohol was removed. The concentrate was then diluted with about 500 ml. of chlorobenzene and oxidized with oxygen by the usual procedure in refluxing chlorobenzene for 1 hour. The solution was then filtered (very little residue noted) using Celite filter aid and concentrated on a steam bath under aspirator vacuum. The concentrate weighed 197 g. and was found to contain 1.425 wt. % Mo and 0.881 wt. % Si. The Si/Mo g.-atom weight ratio was about 2. The solution was stable on storage.

The concentrated catalysts or the catalyst in the original alcohol solution are both useful in the oxidation of olefins to olefin oxide. The catalysts can be preoxidized in the presence or absence of the alcohol used in the catalyst synthesis.

EXAMPLE 3

Oxidation of Propylene to Propylene Oxide Using A Silicon-Containing Molybdic Acid-Isononyl Alcohol Reaction Product The apparatus used for this oxidation experiment was a stirred, ceramic-lined, 500 ml. autoclave. Chlorobenzene solvent containing 23.6 ppm molybdenum (as a silicon-containing, oxidized molybdic acid-isononyl alcohol reaction product) was premixed with oxygen and fed into the autoclave at two points: a connection, bottom center, where this feed was mixed with propylene and a dip tube extending about half-way to the bottom of the autoclave. The autoclave was fitted with a cooling coil to provide close temperature control, and was equipped with a mechanical stirrer with three sets of propellors on the shaft. A product withdrawal tube at the top of the autoclave allowed the product to exit to a cooling coil and then through a backpressure regulator to a gas-liquid separator where the offgas was metered and sampled and the liquid product was retained for weighing and sampling. The solvent-filled reactor was heated to reaction temperature (200°C.) and propylene was fed to the reactor for 10–15 minutes before the oxygen was turned on. After the initial exotherm, about ½ to 1 hour prerun, a steady state was achieved, the product was collected, and the off-gas was sampled. The feed rates for the reaction were as follows: chlorobenzene, 45.6 lbs./hr.; propylene, 8.44 lbs./hr.; oxygen, 564 g./hr. The holding time was 1.2 minutes. The yield of propylene oxide by chromatography, allowing for residues formed, was 56 mol % and the conversion based on propylene was 13 mol %. The residues/oxide wt. ratio was 0.10, and the oxide/acids wt. ratio was 7.9. The soluble molybdenum recovery was 94 % of theory.

Effective amounts of catalyst for the oxidation of olefins to olefin oxides range from about 5 to 1,000 parts per million (ppm) based on the total feedstock. Preferred ranges are between about 10 and 100 ppm.

Examples of the ammonia-containing molybdates are ammonia paramolybdate or "85% molybdic acid" which contains about 85% ammonium paramolybdate.

The hydroxy compounds useful in the synthesis of catalysts of the invention are, for example, primary or secondary alcohols or glycols containing 3 to 30 carbon atoms, or phenols. The alcohols may contain olefinic groups or saturated ether groups. The alcohols may be pure compounds or mixtures of isomers. Mixtures of isomers, particularly those of highly branched or iso alcohols, are usually preferred. The alcohols include primary and secondary linear, branched, alicyclic, aliphatic, and arylaliphatic alcohols, including those with unsaturated olefinic groups or cyclic or aliphatic ether groups. Further examples of hydroxy compounds useful in the synthesis of catalysts of the invention are 5-norbornene-2-methanol, 2,2,4-trimethyl-1,3-pentanediol, nonyl phenol, 3,5,5-trimethyl-1-hexanol, methoxyethanol, 1,3-propylene glycol and 1,2-propylene glycol. There are no required concentration ratios for molybdenum and to the hydroxy compound. However, the hydroxy compound concentration must be in excess of that for the molybdenum compound.

The silicon to molybdenum gram-atom weight ratio can range from 0.25 to 30.

The silicon-containing molybdenum catalysts of the invention are useful as homogeneous oxidation catalysts, particularly for the oxidation of olefins to olefin oxides. They are also of value as metal-plating solutions, lubricant additives, ammoxidation catalysts, printing inks, pigments, or solution components for organic laser devices. These molybdenum compounds may be used as catalysts or co-catalysts for various polymerization processes such as homopolymerization of isocyanates, isocyanate-polyol reactions or olefin oxide polymerization reactions. Olefin oxides are useful in the manufacture of non-toxic antifreeze, urethane-grade polyols and many other applications.

Comparable results to those in the examples, supra, are obtained in synthesizing other catalysts of the invention and in synthesis of olefin oxides from olefins, for example ethylene, propylene, butylene or isobutylene or higher olefins, using the catalysts of my invention.

Having thus described my invention,
I claim:

1. In a liquid phase process for oxidizing olefins to olefin oxides whereby the olefin is heated with oxygen in the presence of an oxidation catalyst and an organic solvent in liquid phase at a temperature sufficient to promote the oxidation reaction, the improvement which comprises oxidizing the olefin in the presence of an effective amount of a hydrocarbon-soluble silicon-molybdenum-hydroxy compound catalyst prepared by reacting a silicon compound (A) at a temperature within the range of about room temperature to about 200°C for a time in the range of about 15 minutes to about 10 hours with a molybdenum-hydroxy compound (B) prepared by heating (1) ammonium molybdate and a (2) hydroxy compound containing from 3 to 30 carbon atoms per molecule selected from the group consisting of phenol, aliphatic hydrocarbyl glycol, organic hydrocarbon primary alcohol, and organic hydrocarbon secondary alcohol, wherein said heating is conducted to a temperature which dissolves said molybdate (1), wherein the hydroxy concentration of (2) is in excess of the molybdate concentration of (1), wherein the said silicon compound (A) is selected from the group consisting of a silicon halide, alkyl silicon halide, aryl silicon halide, alkoxy silicon halide, alkoxy silane, aryloxy silane, epoxyalkyl silane and an epoxy alkoxy silane and wherein the weight ratio of said silicon compound (A) to the molybdenumhydroxy compound (B) is such that the silicon to molybdenum gram atom weight ratio is in the range of 0.25 to 30.

2. A process according to claim 1 wherein the silicon-molybdenum-hydroxy compound product is preoxidized by refluxing said product in the presence of oxygen before it is used to oxidize the olefin.

3. A process according to claim 1 wherein the silicon compound is beta-(3,4-epoxycyclohexyl)ethyltrimethoxy silane or silicon tetrachloride.

4. A process according to claim 1 wherein the olefin is propylene.

5. A process according to claim 1 wherein the hydrocarbon-soluble silicon-molybdenum-hydroxy compound catalyst is present in an amount from about 5 to 1,000 parts per million based on the total olefin feedstock.

* * * * *